April 26, 1966
W. W. WOODBURY
3,247,742
ARTICLE GRIPPING TOOL INCLUDING
PYRAMIDAL GRIPPING ELEMENTS
Filed Oct. 22, 1962
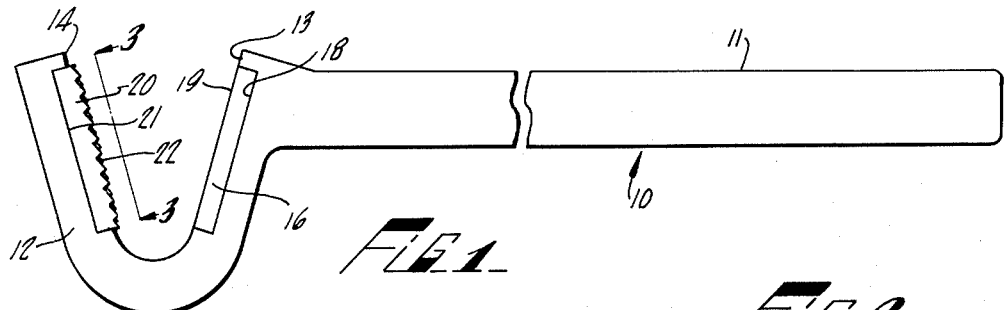
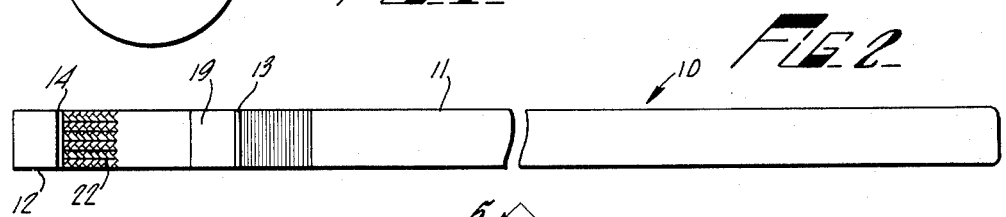
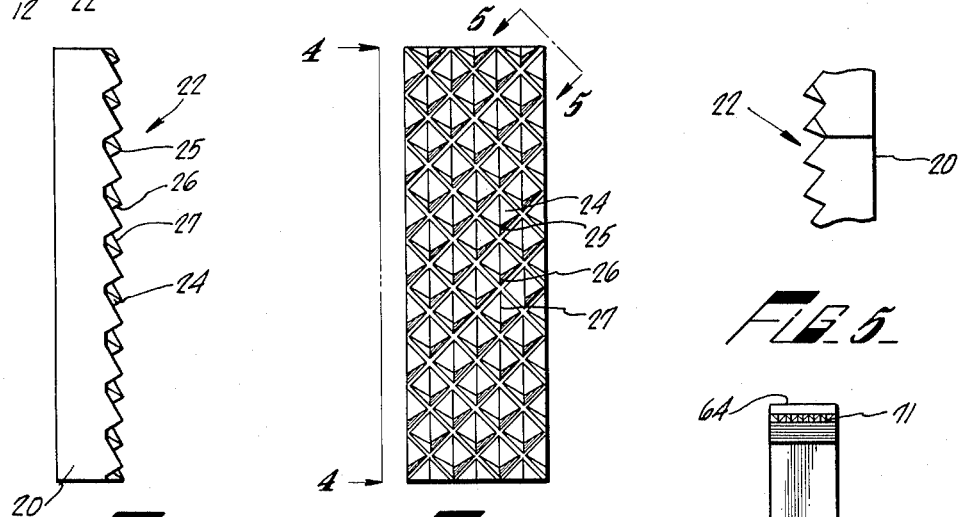
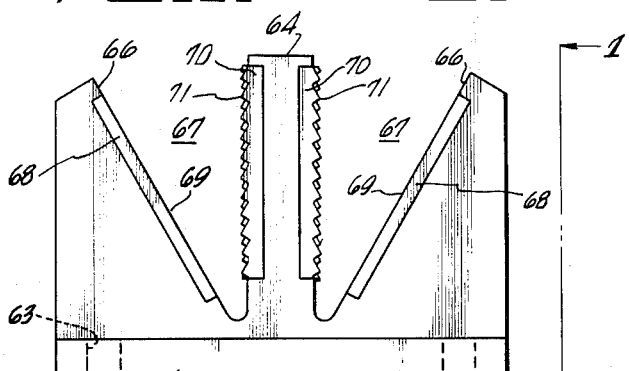
INVENTOR
WILLIAM W. WOODBURY
BY
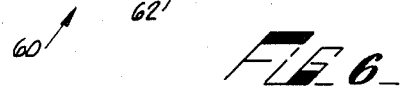
ATTORNEYS.

United States Patent Office 3,247,742
Patented Apr. 26, 1966

3,247,742
ARTICLE GRIPPING TOOL INCLUDING
PYRAMIDAL GRIPPING ELEMENTS
William W. Woodbury, 1121 Stanyan St.,
San Francisco 17, Calif.
Filed Oct. 22, 1962, Ser. No. 231,992
1 Claim. (Cl. 81—120)

This invention provides an improved friction or gripping surface that readily engages articles with all types of surfaces, including those which are hard and smooth.

The gripping surface of this invention is useful in wrenches, bench fixtures, and household tools for tightening or loosening parts which are threaded or friction-fitted together. The surface is of particular use in tools of the "alligator jaw" type. In such a tool, a pair of spaced surfaces are inclined at a slight angle to each other. One of the surfaces is as smooth as is practicable, and the other is made rough. If an object such as a pipe, or a threaded cap on a jar, is rolled along the rough surface so as to engage against the smooth surface, it wedges tightly between the two surfaces, provided that the angle of friction of the object at the rough surface, being the angle whose trigonometrical tangent is the coefficient of friction between the object and the rough surface, less the angle of friction of the object at the smooth surface, being the angle whose trigonometrical tangent is the coefficient of friction between the object and the smooth surface, exceeds the included angle between said pair of spaced surfaces.

When the criterion of the preceding paragraph is met, gripping in torsion is certain with transverse force needed only to hold the object in contact with the pair of surfaces. Friction coefficients will vary for given rough and smooth surfaces according to the material and finish of the surfaces of the objects, though remaining generally high for rough surfaces and low for smooth. Accordingly a greater variety of materials and surface finishes may be accommodated by having the lowest possible coefficient of friction between the smooth surface and the objects, the highest possible coefficient of friction between the rough surface and the objects, and a small angle between the two surfaces. There are practical limitations, however, to the smallness of the angle. For a given torque on the object, the smaller the angle the greater the crushing force on the object, a disadvantage for thin walled objects like jar lids; the smaller the angle the greater the spreading force on wrench or fixture jaws, a disadvantage in heavy work with thick walled tubing or rod; and the smaller the angle the deeper the jaws—hence the larger the tool—to accommodate a given variety in sizes of objects.

This invention provides a rough gripping surface which permits a relatively large angle between the rough surface and the smooth surface so the tool can be of a reasonable size. Moreover, the rough surface has a sufficiently high coefficient of friction against the object to be gripped that little or no transverse force is required on the object to wedge it between the smooth and rough surfaces.

Briefly, the gripping surface of this invention includes an array of sharp pointed projections which are spaced over the surface. Preferably, the projections are pyramids with apexes that are as sharp as is practicable. That is, all edges of a respective pyramid converge to intersect substantially in a point, thereby forming a sharp apex.

Preferably, the base of each pyramid is four-sided, the bases of the pyramids oriented in the same direction, and the pyramids formed in rows and columns to provide the desired friction surface. Two adjacent faces of each pyramid are formed more nearly normal to the major plane of the friction surface than the other two faces. Stated another way, the edge common to the more nearly normal faces is more nearly perpendicular to the major plane of the friction surface than the other edges of the pyramid.

When used as a gripping tool, the friction surface of this invention is disposed opposite a body having a smooth surface, and the smooth surface and friction surface are disposed to converge toward a vertex. The pyramids are oriented so that a diagonal of the base of each is normal to said vertex, and the two faces of the pyramids formed more nearly normal to the major plane of the friction surface lie adjacent to the edge nearest to the vertex. In the form of a wrench, the tool includes an elongated handle for applying torque to the gripped objects.

The presently preferred gripping surface includes a first set of elongated, substantially parallel grooves. A second set of elongated, substantially parallel grooves are provided in the friction surface to extend transversely to and intersect the first set of grooves. The grooves in the first and second sets each have upwardly and outwardly sloped sides so that the intersecting grooves form pyramids with outwardly extending sharp points.

Preferably, the grooves in the first and second sets are spaced to form sharp pointed, four-sided pyramids. To improve gripping, the pyramids are so oriented and the slopes of the faces so chosen that a diagonal of the base and those two edges which join said diagonal to the point of each pyramid lie in a plane normal to the axis about which torque is expected in use of the tool. In this attitude the edges of the pyramids away from the vertex of the smooth and rough surfaces act as buttresses against the principal force arising in use. For a chosen sharpness of point, the points may even be directed to meet the reaction force from the smooth surface "head on" to the precision with which the angle of friction of the object at the smooth surface can be anticipated.

These and other aspects of the invention will be more fully understood from the following detailed description and the accompanying drawings, in which:

FIG. 1 is an elevation of a wrench using the friction surface of this invention;

FIG. 2 is a plan view of the wrench of FIG. 1;

FIG. 3 is a view taken along line 3—3 of FIG. 1 of the friction surface;

FIG. 4 is a view taken along line 4—4 of FIG. 3;

FIG. 5 is a view taken along line 5—5 of FIG. 3;

FIG. 6 is an elevation of a bench fixture using the friction surface; and

FIG. 7 is a view taken on line 7—7 of FIG. 6.

Referring to FIGS. 1 and 2, a wrench 10 includes an elongated handle 11 having a V-shaped head 12 formed integrally at one end. The head includes a pair of inwardly facing elongated surfaces 13 and 14 which are perpendicular to the plane of FIG. 1, and converge toward the vertex of the head.

A first elongated insert plate 16 is press-fitted into a recess 18 in the surface 13 of the wrench. Preferably, the first insert plate is a hard polished metal which presents a smooth reaction surface 19 facing toward the other surface 14 in the wrench head. A second insert plate 20 is press-fitted into a recess 21 in the surface 14 of the wrench head. The second insert plate has a rought exposed surface 22 facing toward the smooth surface 19. The major planes of the smooth and rough surfaces are perpendicular to the plane of FIG. 1, and converge toward each other at the vertex of the wrench head.

As shown best in FIGS. 3, 4, and 5, a preferred form of the rough surface is made up of an array of pyramids 24 disposed so the peaks or apexes 25 of the pyramids lie in a square array inclined at 45° to the sides of the wrench jaw.

The base of each pyramid may be of any convenient shape, e.g., triangular, quadrangular (rhomboidal or square in particular), polygonal, etc. The bases of the pyramids shown in FIG. 3 are square and are arranged with the diagonals of the bases extending parallel and perpendicular to the sides of the wrench jaw (the plane of FIG. 1). For the purpose of describing this invention, the inclined surfaces of the pyramids are called faces, and the lines defined by their intersection with the base are called sides of the pyramids. The inclined lines defined by intersecting faces are called the edges of the pyramids. In the attitude shown in FIG. 3 each pyramid has a leading edge 26 and a trailing edge 27, the latter edge being inclined at a smaller angle to the major plane of the friction surface than the former.

The pyramids or teeth are arranged so a diagonal of each pyramid extends away from the vertex of the wrench head. Leading edge 26 is more nearly perpendicular to the major plane of the friction surface than any of the other edges of each respective pyramid. The leading edge is also oriented to be closer to the vertex of the wrench head than any of the other edges of each respective pyramid. This provides maximum buttressing for the point of the pyramid against the principal force attendant on use of the wrench.

FIGS. 6 and 7 show a bench fixture 60 which is similar to the wrench arrangement, except that the bench fixture includes an outwardly extending base 62 with holes 63 for mounting the fixture on a bench (not shown). Preferably, the fixture includes a vertical center post 64 and a pair of upwardly and outwardly inclined sides 66 which form a pair of upwardly opening V-shaped recesses 67. A separate hard insert plate 68 with a smooth surface 69 is disposed in the surface of each side 66. A separate second insert plate 70 is mounted on opposite sides of the center post 64 to provide friction surfaces 71 facing toward the smooth surfaces 69. Each friction surface 71 is identical with that shown and described with respect to FIGS. 1 through 5, and is not described again in detail. As with the other arrangement, the edges of the pyramids nearest the vertex of the V-shaped spaces 67 of the bench fixture are at a greater angle to the major plane of the friction surface than are the edges away from said vertex.

I claim:

A tool for gripping an article, the tool comprising a first body having a rough surface for engaging the article, the rough surface including a plurality of spaced pyramids with outwardly extending apexes, each apex being defined by the convergence of all edges of a respective pyramid substantially to a point, one of said edges of each pyramid being a leading edge and more nearly perpendicular to the major plane of the rough surface than the other edges of the pyramid, and a second body having a smooth surface spaced opposite from the rough surface, the two surfaces being disposed to converge toward a vertex, the pyramids being oriented so that the base of said leading edge of each pyramid is nearer the vertex than the other edges of the pyramid.

References Cited by the Examiner

UNITED STATES PATENTS

| | | | |
|---|---|---|---|
| 35,971 | 7/1862 | Doolittle | 81—120 |
| 968,106 | 8/1910 | Zimmermann | 81—120 |
| 1,908,421 | 5/1933 | Heggem | 81—186 |
| 2,214,241 | 9/1940 | Baxendale | 279—46 |
| 2,255,221 | 9/1941 | Lapointe | 90—64 |
| 2,357,094 | 8/1944 | Edgar | 90—64 |
| 2,517,366 | 8/1950 | Wilson | 81—186 |
| 2,895,365 | 7/1959 | Myers et al. | 81—186 |
| 2,962,919 | 12/1960 | Grundmann et al. | 81—186 |

WILLIAM FELDMAN, *Primary Examiner.*

MILTON S. MEHR, *Examiner.*